United States Patent Office 3,597,428
Patented Aug. 3, 1971

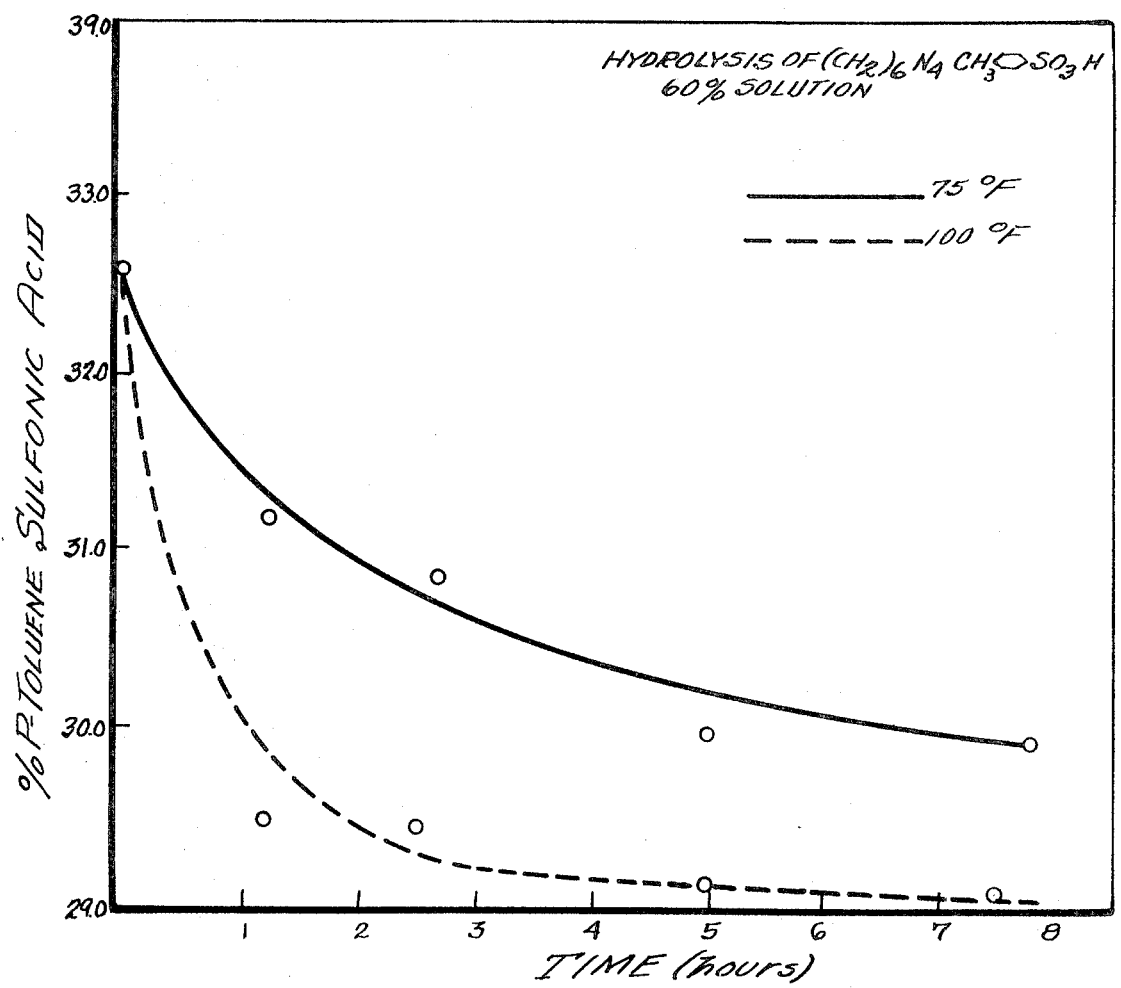

3,597,428
SPRAY-DRYING SALTS OF HEXAMETHYLENE
TETRAMINE
Ingenuin A. Hechenbleikner, Cincinnati, Ohio, assignor to Carlisle Chemical Works, Inc., Reading, Ohio
Filed May 1, 1969, Ser. No. 820,984
Int. Cl. C07d 55/60
U.S. Cl. 260—248.5                14 Claims

ABSTRACT OF THE DISCLOSURE

Hexamethylene tetramine salts are prepared by spray drying aqueous solutions of hexamethylene tetramine and acids.

The present invention relates to the preparation of salts of hexamethylene tetramine.

Salts of hexamethylene tetramine have been known for a long time, e.g. see British Pat. 160,258 of Mar. 15, 1921, which mentions typical inorganic and organic acid salts such as the chloride, sulfate, citrate, benzene sulfonate, toluene-p-sulfonate, etc.

It is a well-known fact that strong acid salts of hexamethylene tetramine cannot be made by evaporating the aqueous salt solution to dryness. Such treatment causes extensive hydrolysis and large quantities of formaldehyde are liberated. If the aqueous solution is kept at a low temperature and then evaporated by applying a high vacuum hydrolysis can be reduced. This procedure is not very attractive for large scale operation due to the problem of handling the solution during precipitation and drying while under a high vacuum.

Accordingly, it is a primary object of the present invention to develop an improved process for preparing hexamethylene tetramine salts.

Another object is to eliminate hydrolysis when converting an aqueous solution of hexamethylene tetramine salt to the dry salt.

Still further objects and the entire scope of applicability of the present invention will become apparent from the detailed description given hereinafter; it should be understood however, that the detailed description and specific examples, while indicating preferred embodiments of the invention are given by way of illustration only, since various changes and modifications within the spirit and scope of the invention will become apparent to those skilled in the art from ths detailed description.

It has now been found that these objects can be attained by spray drying an aqueous solution or suspension of the hexamethylene tetramine salt. It was surprising to find that by subjecting aqueous solutions of hexamethylene tetramine salts, particularly salts of strong acids such as benzene sulfonic acid, toluene sulfonic acid, methane sulfonic acid and sulfuric acid, to a spray drying operation, little or no hydrolysis occurred despite the high temperature in the spray drier and that a dry, finely divided product resulted.

The spray dried products are useful as acidic sources of hexamethylene tetramine. When heated in aqueous solution, they liberate formaldehyde without becoming more acidic, since the ammonium salts formed by the hydrolysis act as a buffer. The non-toxic salts can also be employed as is known in the art as internal antiseptics.

The single figure of the drawing is a graph showing the hydrolysis of the p-toluene sulfonic acid salt of hexamethylene tetramine at 75° F. (23.9° C.) and 100° F. (37.8° C.). The initial solution containing 60 parts of the hexamethylene tetramine p-toluenesulfonate salt in 100 parts of water. The amount of hydrolysis is indicated by the reduction in titratable toluene sulfonic acid. Hexamethylene tetramine is such a weak base that the p-toluene sulfonic acid salt thereof can be titrated as p-toluene sulfonic acid when in aqueous solution. When hexamethylene tetramine p-toluene sulfonate hydrolyzes there is formed ammonium p-toluene sulfonate. Since ammonia is a much stronger base than hexamethylene tetramine, the ammonium p-toluene sulfonate does not titrate as p-toluene sulfonic acid. Hence, the reduction in amount of titratable p-toluene sulfonic acid is an indication of the degree of hydrolysis. It can be seen from the graph that even at 75° F. (about room temperature) there is significant hydorlysis within one hour and that at 100° F. (about blood temperature) there is substantial hydrolysis in a much shorter period of time. Of course, as the temperature is increased further, the hydrolysis rate goes up very markedly.

Despite this predilection for hexamethylene tetramine salts to hydrolyze very rapidly at elevated temperatures in aqueous solution as stated, it has been found that by using a spray drying procedure such hydrolysis can be avoided.

Unles otherwise indicated, all parts and percentages are by weight.

An aqueous solution or suspension of the acid can be mixed with an aqueous solution of hexmethylene tetramine and the mixture then spray dried. Using this procedure, a temperature as high as 40° C. can be employed for a very short period of time of mixing. Prefereably, however, the mixture is kept from just above the freezing point to room temperature (about 0° C. to about 25° C.) prior to spray drying. The preferred procedure for spray drying, however, is to continuously mix a stream of hexamethylene tetramine in water with a stream of the acid in water just before the two streams reach the spray drier and then spray drying at once. In this procedure the streams can be at a temperature of from 0 to 100° C. (i.e. to just below the boiling point of the water) although preferably the temperature is not above about room temperature.

The aqueous solution or suspension of acid can contain from 1% to 90% of acid and the balance water. Preferably the solution contains 20 to 80% of acid.

The aqueous solution of hexamethylene tetramine can contain 1% of hexamethylene tetramine up to the solubility limit (150 grams of hexamethylene tetramine in 100 grams of water at 20° C.) at the temperature. Preferably there is employed at least 20% hexamethylene tetramine.

The range in proportion of hexamethylene tetramine and acid to water, however, is not of primary importance.

The ratio of hexamethylene tetramine to acid is usually 1 to 1 on a mole basis in order to form the monosalt. As is known in the art, hexamethylene tetramine also can form diacid salts with some acids. If the diacid salt is desired, then 2 moles of hexamethylene tetramine are employed per mole of acid.

The spray drying temperature conditions are not particularly critical, thus inlet temperature of 300 to 600° F. (about 150 to 317° C.) can be used. The outlet temperature is not critical and is simply maintained below the melting point of the salt.

The process is particularly useful in preparing hexamethylene tetramine salts of water soluble acids which cannot be dried successfully by other drying procedures. Such water soluble acids are soluble in water to an extent of at least 5 parts per 100, preferably at least 10 parts per 100 parts of water.

Typical examples of acids which can be used to prepare the salts are sulfuric acid, hydrochloric acid, hydrobromic acid, hydriodic acid, perchloric acid, phosphoric acid, chromic acid, dimethyl phosphoric acid, phenyl phosphonic acid, methane phosphonic acid, o-xylene-4-sulfonic acid, benzene sulfonic acid, monophenyl phosphoric acid, methane sulfonic acid, ethane sulfonic acid, p-toluene sulfonic acid, o-toluene sulfonic acid, m-toluene sulfonic acid, trichloroacetic acid, α-naphthalene sulfonic acid, β-naphthalene sulfonic acid, methane diphosphonic acid, methane disulfonic acid, d-camphoric acid, 1-camphoric acid, o-phenol sulfonic acid, p-phenol sulfonic acid, boric acid, salicylic acid, quinic acid, 3-sulfosalicylic acid, o-sulfobenzoicacid, acetylaminosalicylic acid, 1,5-naphthalene disulfonic acid, diisopropyl naphthalene sulfonic acid, dibutyl naphthalene sulfonic acid, dl-mandelic acid, d-mandelic acid, benzoic acid, caproic acid, acetic acid, propionic acid, butyric acid, isobutyric acid, formic acid, phthalic acid, stearic acid, oleic acid, linoleic acid, lauric acid, palmitic acid, sebacic acid, ricinoleic acid, oxalic acid, abietic acid, phenylacetic acid, malonic acid, succinic acid, glutaric acid, adipic acid, valeric acid, tartaric acid, phenyl propionic acid, cinnamic acid, β-oxyhydrocinnamic acid, arsenous acid, citric acid and tannic acid.

EXAMPLE 1

Hexamethylene tetramine: 70 lbs. (0.5 mols)
Concentrated hydrochloric acid: 50 lbs. (0.5 mols)

The hexamethylenetetramine was dissolved in 50 pounds of water and this solution mixed with the hydrochloric acid, keeping the temperature at 25° C. The resulting solution was then fed into a Nichols Niro Mode II spray drier with inlet air at a temperature of 400° F. (204° C.). The hexamethylene tetramine hydrochloride product came out of the drier as a fine powder melting at 188–189° C.

EXAMPLE 2

A stream containing 7 parts of hexamethylene tetramine dissolved in 5 parts of water at 25° C. and a stream containing 5 parts of concentrated HCl (hexamethylene tetramine to HCl mol ratio of 1:1) at 25° C. were continuously mixed just prior to entering the spray drier and spray drying as in Example 1 at an inlet air temperature of 400° F. The hexamethylene tetramine hydrochloride product was a fine powder similar to that obtained in Example 1.

EXAMPLE 3

50% aqueous sulfuric acid in an amount of 100 pounds (0.5 mols) was mixed with 70 pounds (0.5 mols) of hexamethylenetetramine dissolved in 50 pounds of water. The mixture was kept at 25° C. and was then spray dried at an air inlet temperature of 450° F. (232° C.). The hexamethylene tetramine sulfate product obtained as a fine white powder melting at 185–187° C.

EXAMPLE 4

The procedure of Example 2 was repeated replacing the HCl by 10 parts of 50% aqueous sulfuric acid to give the desired product as a fine white powder.

EXAMPLE 5

172 pounds (0.5 mols) of 50% aqueous p-toluene sulfonic acid were mixed with 70 pounds (0.5 mols) of hexamethylene tetramine dissolved in 50 pounds of water. The mixture was kept at 25° C. and was then spray dried with an air inlet temperature of 205° C. The hexamethylene p-toluene sulfonate product was a fine powder melting at 158–160° C.

EXAMPLE 6

The procedure of Example 2 was repeated replacing the HCl by 17.2 parts of 50% aqueous p-toluene sulfonic acid to give the desired hexamethylene tetramine p-toluenesulfonate as a fine powder.

The acids used in the specific examples can be replaced by any of the other acids set forth supra with appropriate adjustment of the drying temperature to insure that the spray dried product emerges as a fine powder.

What is claimed is:

1. A process for preparing anhydrous salts of hexamethylene tetramine and an acid without hydrolysis comprising spray drying an aqueous mixture of the acid and hexamethylene tetramine and recovering the finely divided salt in anhydrous form.

2. A process according to claim 1 wherein the acid is not water soluble and the acid is suspended in water.

3. A process according to claim 1 wherein the acid is water soluble and the acid is dissolved in water.

4. A process according to claim 3 wherein the temperature of the aqueous mixture prior to spray drying is maintained at not over 25° C.

5. A process according to claim 3 wherein an aqueous stream containing dissolved acid and an aqueous stream containing dissolved hexamethylene tetramine are intermingled just prior to the spray drying to form said salt.

6. A process according to claim 3 wherein the acid is a strong organic acid.

7. A process according to claim 6 wherein the acid is a sulfonic acid.

8. A process according to claim 7 wherein the acid is p-toluene sulfonic acid.

9. A process according to claim 8 wherein the hexamethylene tetramine and p-toluene sulfonic acid are employed in equimolar amounts.

10. A process according to claim 3 wherein the acid is a strong inorganic acid.

11. A process according to claim 10 wherein the acid is hydrochloric acid.

12. A process according to claim 10 wherein the acid is sulfuric acid.

13. A process according to claim 1 wherein the spray drying is carried out at an inlet temperature of 300 to 600° F.

14. A process according to claim 13 wherein an aqueous stream containing dissolved acid and an aqueous stream containing dissolved hexamethylene tetramine are intermingled just prior to the spray drying to form said salt.

References Cited

UNITED STATES PATENTS 2,764,581    9/1956    Scholz et al. _____ 260—248.5

JOHN M. FORD, Primary Examiner